Oct. 5, 1965 K. EHRAT 3,210,730

APPARATUS FOR SIMULTANEOUSLY PERFORMING SWITCHING OPERATIONS IN SPATIALLY SEPARATED TRANSMITTER AND RECEIVER UNITS

Filed Sept. 26, 1961 4 Sheets-Sheet 1

Inventor
Kurt Ehrat
By Pierce, Scheffler & Parker
Attorneys

APPARATUS FOR SIMULTANEOUSLY PERFORMING SWITCHING OPERATIONS IN SPATIALLY SEPARATED TRANSMITTER AND RECEIVER UNITS

Filed Sept. 26, 1961 4 Sheets-Sheet 2

Inventor
Kurt Ehrat
By Pierce, Scheffler & Parker
Attorneys

Inventor
Kurt Ehrat
By Pierce, Scheffler & Parker
Attorneys

Inventor
Kurt Ehrat
By Pierce, Scheffler & Parker
Attorneys

United States Patent Office 3,210,730
Patented Oct. 5, 1965

3,210,730

APPARATUS FOR SIMULTANEOUSLY PERFORMING SWITCHING OPERATIONS IN SPATIALLY SEPARATED TRANSMITTER AND RECEIVER UNITS

Kurt Ehrat, Zurich, Switzerland, assignor to Gretag Aktiengesellschaft

Filed Sept. 26, 1961, Ser. No. 140,932
Claims priority, application Switzerland, Sept. 30, 1960, 11,039/60
5 Claims. (Cl. 340—147)

This invention relates to a method and to an arrangement for simultaneously performing a switching process at a plurality of appliances spatially separate from one another and cooperating as transmitter(s) and receiver(s).

In many fields of communications technique and of telemetering technique it is required to perform a switching process simultaneously at appliances spatially separate from one another, which cooperate with one another as transmitter(s) and receiver(s), for example via an electrical message channel.

This case arises for example in teleprinter channels, wherein in order to maintain secrecy, encoding appliances are located between transmitter and receiver when—in the course of transmission—it is intended to change over from uncoded operation to coded—or enciphered—operation. In the case of such intrinsically known coding appliances, the pulse sequence transmitted by the transmitter is usually mixed with a second sequence of pulses, which is as irregular as possible and is designated the coding pulse sequence, whereby a sequence of coded pulses is obtained and transmitted. At the receiver, the incoming coded pulses are mixed in the contrary sense with an identical coding pulse sequence, and the original pulse sequence generated by the teleprinter transmitter is thus re-established at the output of the coding appliance at the receiving end and fed to the teleprinter receiver, which prints the message in clear text. It is a necessary condition for correct transmission of coded messages that coding pulse sequences which are as irregular as possible, but identical, should be generated at the transmitter and at the receiver, and this is generally effected by the use of mechanical or electromechanical apparatuses, for example of punched strips or of cascade-connected contact discs or cam discs. In these coding appliances, therefore, the sequence of pulse combinations is precisely determined by the structure of punching of the punched tapes. When two identical appliances or punched tapes are brought into identical starting positions, subject to simultaneous starting and to the observance of the step synchronism—i.e., subject to step equality at any moment—they generate identical pulse sequences, in which case it is necessary to ensure by observing the step synchronism that at any subsequent moment the number of steps previously passed through is identical in both appliances—i.e., the step integral must always coincide.

In order for coding at the transmitter and decoding at the receiver to proceed correctly, punched strips or contact discs must be set in motion at the same moment as from the coincident starting point. To this end, starting of the appliance or switching over from uncoded to coded operation must be reliably simultaneous. Usually, the two stationary coding appliances are first brought to the same starting position, and are started up simultaneously with the change-over from uncoded to coded transmission.

If the transmitting appliance and receiving appliance are directly connected together by a wire, then the change-over usually presents no difficulty. The coding appliances at the transmitter and receiver are adjusted to the same point of the coding pulse sequence, and the switching command for change-over is transmitted from the transmitter to the receiver by a signal of appropriate nature—for example, a switching pulse.

The circumstances are fundamentally different as soon as the transmitter and receiver are connected together by wireless. Having regard to the known inadequacies of radio transmission, a simple outright communication of a switching command is inadequate in this case. Either switching pulses which have not been put out at all by the transmitter may be simulated at the receiving end by noise on the transmission channel, or the transmission of the switching command may fail due to fading. In any case, whenever a wireless channel is used it is impossible to achieve the requisite reliability of operation by a single switching pulse for the change-over.

Methods have also already been proposed wherein the change-over occurs only after a specific sequence of pulses or characters have been transmitted and received unmutilated at the receiver. But the improvement thereby gained is inadequate, since here again a single noise pulse, or the loss of a single pulse, prevents correct change-over. A report back to the transmitter which actuates the successful simultaneous start can often not be performed in the case of alternate connections over one channel.

According to the present invention there is provided a method of simultaneously performing a switching process independently of noise pulses in at least two appliances at least one of which is arranged to operate as a transmitter and at least one of which is arranged to operate as a receiver, especially in the case of coding appliances, wherein, upon a signal emitted by the transmitter, a program source is set in motion at each of the transmitter(s) and receiver(s) and maintained rhythmically and pulse-synchronously in motion by intrinsically known means, and wherein both programme sources generating a sequence of characters which sequences are compared at the receiver, the phase of the receiver programme source being brought into correspondence with the phase of the transmitter programme source on the basis of the said comparison, whereupon after a predetermined number of cycle steps each programme source trips the switching process at the associated appliance.

The invention further provides an arrangement for performing the said method, comprising at least two appliances, at least one of which is arranged to operate as a transmitter and at least one of which is arranged to operate as a receiver, each such appliance including a stepping mechanism, means for maintaining pulse synchronism of the stepping mechanism, means for generating a character sequence in dependence upon the cycle of the stepping mechanism, a switching apparatus actuatable by the stepping mechanism after passage of a predetermined number of steps, and, at least in the case of the appliance(s) arranged to operate as a transmitter, means for testing the phase deviation between the stepping mechanism and means for correcting the phase deviation.

It is a necessary condition for the correct functioning of the installation that pulse-synchronism of the programme sources at transmitter and receiver(s) should be maintained after one cycle has been completed, namely independently of one another—i.e., also, independently of synchronizing pulses transmitted between the transmitter and the receiver(s). The solution of this problem is well-known in teleprinter technique. It is applied particularly in the case of wireless teleprinter connections. In this case, synchronism is usually established by pulses transmitted from the transmitter to the receiver; the latter generally do not control the receiver directly but only influence a local chronologically stable clock, so that even in the event of failure of the pulses the pulse-synchronism is maintained at least for a certain period of time. This type of synchronization is also frequently designated "flywheel synchronization."

The comparison of the character sequences generated by the transmitter and the receiver, and the establishment of phase equality of the programme sources effected on the basis of the said comparison, may be performed either automatically or by an operator who receives—for example, by observing writing appliances—the necessary instructions for establishing phase equality of the receiver appliance operated by him with the transmitting appliance.

In the case of manual operation, where writing appliances are used at the transmitter and receiver, character sequences consisting of pulse combinations interrupted by interstices are generated in dependence upon the progress of the programme sources, which are printed in common in the writing appliance of the receiver, and phase coincidence of the receiver programme source is established by an operator on the basis of the printed characters. The intercombinations of the transmitter and of the receiver are mixed together, for example in a mixing unit, in such a manner that in the case of chronological coincidence of incoming and locally generated combinations of characters—i.e., in the case of phase equality of the programme sources—the combinations cancel each other out. The mixing unit feeds the teleprinter of the receiver. If phase equality is present, so that the character pulses cancel each other out, then the receiver teleprinter does actually run, but no characters are printed. If a phase difference exists between the program sources, i.e., if the incoming and local pulse combinations are chronologically staggered by one or more steps, then they no longer cancel each other out in the mixing unit, the incoming characters and the locally generated characters are printed in succession in the writing appliance. The operator now observes the receiver teleprinter as a guide for the correction. If no characters are printed, then phase synchronism exists, and adjustment is superfluous. If on the other hand characters are printed one after the other, then phase synchronism does not exist.

In order to visualize the direction of the step deviation one of the character sequences may be modified before printing, for example in front of the input to the mixing unit, in such a manner that the individual combinations which belong together in the case of phase equality correspond to different characters, as which they are printed. For example, the unmodified character sequence consists of a plurality of characters "M." In the absence of phase synchronism, the pulses generated by the local appliance are so modified that they correspond to the character "T." If the teleprinter prints the "M" before the "T," then the receiver is lagging. If on the other hand the "T" is printed before the "M," then the receiver is leading.

The programme sources are equipped with a mechanism which makes it possible to adjust the local programme source, for example, by a mechanical differential or by influencing the steps of advance. In the absence of phase synchronism, the operator can adjust the local programme source and simultaneously observe the modification of the printed characters until cancelling of the characters occurs—i.e., until phase synchronism of the programme sources at both stations has been achieved. After performance of a prescribed number of steps, the programme sources trip the switching process. In the case of coded teleprinter transmission, the change-over from uncoded to coded operation now occurs.

In order to enable the operator to verify that the installation is in step, and possibly to adjust it, a sufficiently large number of steps must be available, since after these steps have elapsed both the stepping mechanisms automatically change over. If in this interim period the operator had succeeded in establishing synchronism, then the change-over occurs simultaneously. If for any reason it had not proved possible to establish synchronism, then the operator must interrupt the transmission and perform the entire process of synchronization once more.

The establishment of phase equality may also be effected fully automatically. In this case, the programme source located at the receiver is automatically influenced in its speed of cycle in dependence upon the result of the comparison of the character sequences, until phase equality has been established. The transmitter and the receiver transmit identical character sequences of constantly modified pulse combinations which are mixed at the receiver, while in the case of phase deviation the mixture supplies a control quantity dependent upon the direction.

The sequence of pulse combinations preferably corresponds to an ascending, or descending, series of numbers in the binary system. The individual pulse combinations are compared position by position in the comparator apparatus starting from the higher positional values. In the case of phase deviation, the local programme source is delayed or additionally advanced by one step in each case, whereupon the test is continued.

In order to prevent the phase equality, when once achieved, from being lost due to noise effects, the readjustment of the programme source by the mixer unit may additionally be interrupted as soon as the comparison of the pulse sequences has revealed the existence of phase equality several times in succession.

In order to enable the invention to be more readily understood, reference will now be made to the accompanying drawings, which illustrate diagrammatically and by way of example two embodiments thereof and in which.

Figure 1:
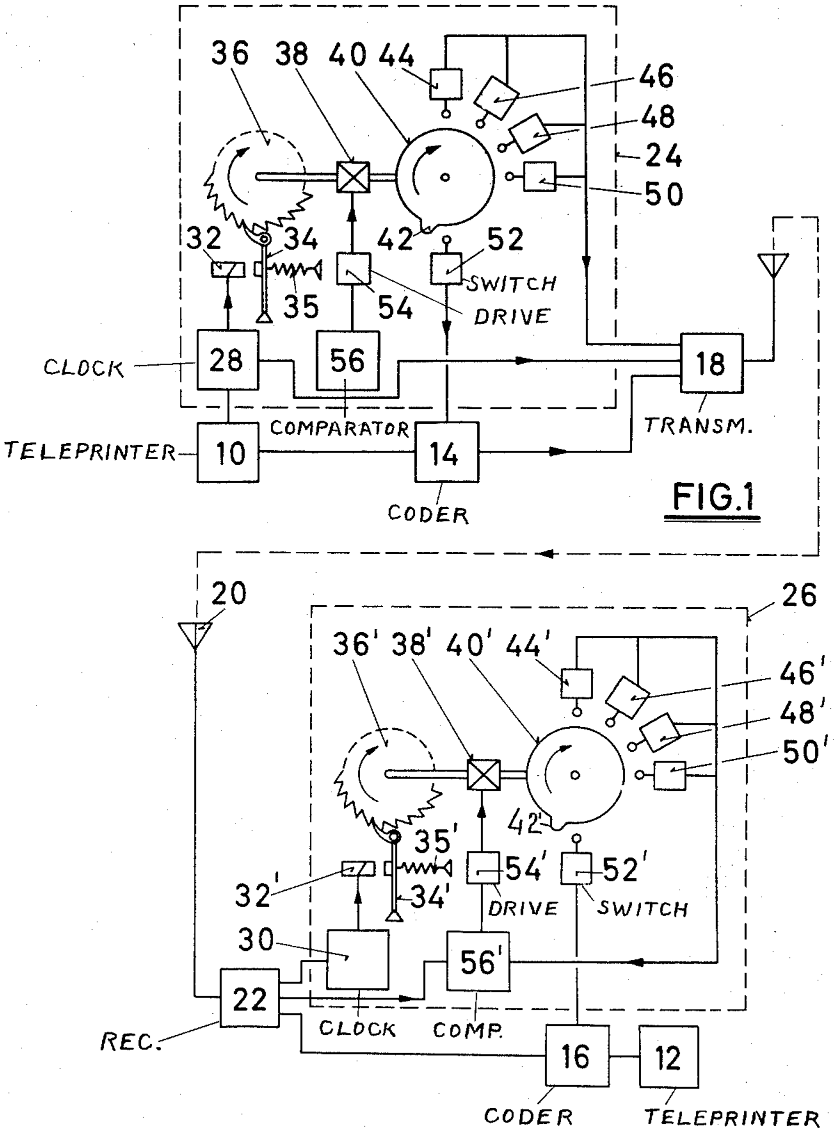
FIGURE 1 shows, partially diagrammatically, partially as a block circuit diagram, the transmitter and receiver of an installation for performing the method of the present invention.

Referring now to FIGURE 1, the transmitting station and receiving station of an installation for performing the present method each include a teleprinter 10 or 12, and a coding appliance 14 or 16 respectively. At the transmitting station, a punched tape reader may also take the place of the teleprinter 10. The characters emanating from the teleprinter 10 of the transmitting station pass via a transmitter 18, a wireless connection indicated by a broken line 20, and a receiver 22 to the teleprinter 12 of the receiving station. The transition from uncoded transmission to coded transmission is effected by simultaneously switching on the coding appliances 14 and 16, and by the appliances enclosed by the broken lines 24 and 26 at the transmitting and receiving stations respectively, which consist essentially of identical components, but which function differently in the transmitting station and in the receiving station. For purposes of distinguishing between like numbered components at the transmitting and receiving stations, those numbers at the receiving station have been primed.

Clocks 28 and 30 generate synchronizing pulses which are necessary for establishing pulse synchronism between the transmitting station and the receiving station. These pulses at the transmitting station operate a stepping mechanism consisting of a magnet 32, a stepping pawl 34 with a restoring spring 35, and a ratchet wheel 36. The synchronizing pulses generated by the clock 28 are transmitted to the receiving station, where they establish pulse synchronism of the clock 30 at the receiving end. The pulses produced by the receiver clock 30 operate a similar stepping mechanism consisting of elements 32', 34', 35' and 36'. The clocks may possibly be parts of the teleprinter or punched tape reader at the transmitting station or receiving station which fulfill the above-mentioned functions. The stepping mechanism at the transmitting station actuates, via a differential 38, a cam plate 40, each cam plate carrying a switching cam 42 which in rotating is arranged successively to actuate four character sources 44, 46, 48 and 50. The stepping mechanism, the cam plate and the character sources together form the so-called programme source. In its cycle, the switching cam 42 is also arranged to actuate a switching device 52. On being actuated by the switching cam 42, the character sources generate specific characters—e.g., in the form of identical or different pulse combinations. The stepping mechanism at the receiving station actuates the element 38', 40', 42', 44', 46', 48', 50' and 52'. The outputs of the character sources 44–50 are connected in parallel and those at the tranmitting station feed the transmitter 18, while those, 44'–50' at the receiving station feed a comparator appliance 56'. The drive of the cam plate 40 is effected by the stepping mechanism via the differential 38 which is capable of adjustment by a drive device 54, controlled by the comparator appliance 56. The differential 38, the drive device 54 and the comparator appliance 56 are fundamentally unnecessary, and out of action, in the transmitting appliance. They are however present there in order to permit alternative operation of each appliance as transmitter or receiver.

The character sequence generated at the transmitter by actuation of the character sources upon revolution of the stepping mechanism is transmitted, together with the synchronizing pulses generated by the clock 28, to the receiver, where splitting up of the pulses transmitted occurs. The synchronizing pulses control the clock 30 at the receiving end, the pulses of the character sequence pass to the comparator appliance 56, where they are compared with the character sequence generated at the receiving end. The comparison of these characters yields a criterion for the phase deviation in the cycles of the two stepping mechanisms. This comparison shows whether both stepping mechanisms are running in equal phase, or whether lagging or leading exists—e.g., of the stepping mechanism at the receiving station. The drive device 54' serves to bring both stepping mechanisms into equal phase on the basis of this comparison by actuating the differential 38' at the receiving station. The stepping mechanisms are so arranged that the cam plates, 40, 40' when set in motion from their respective positions of rest as illustrated execute one full revolution without interruption. At the end of that revolution, the switching cams 42, 42' actuate the switching devices 52, 52' which—as illustrated—then effect switching in of the coding appliances 14 and 16 respectively.

Figure 2:
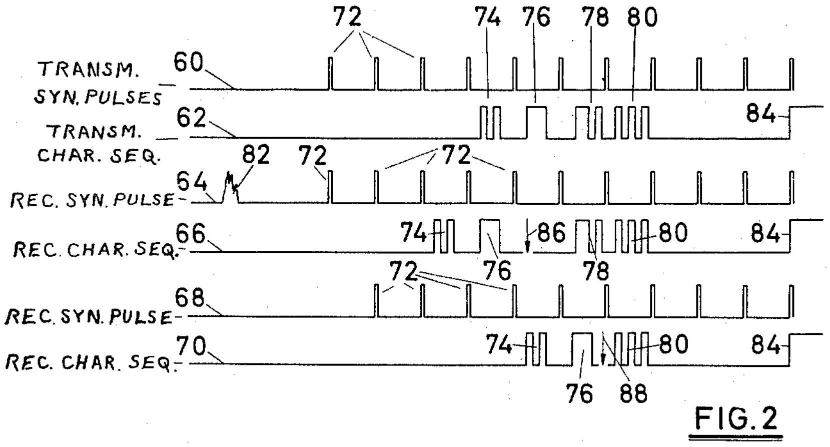
FIGURE 2 represents the chronological cycle of the character sequences.

The processes of operating the installation illustrated diagrammatically in FIGURE 1 will now be explained wtih reference to the time-pulse diagram in FIGURE 2, in which the lines 60 and 62 represent the synchronizing pulses and character sequences generated by the transmitting appliance, against the time as abscissa. The lines 64, 66 and 68 represent the corresponding pulses and character sequences which are operative at the receiving appliance.

In principle, the coded transmission of a message is agreed upon during uncoded service between the stations operating as transmitter and receiver, and both stations are made ready for service. The clock 28 at the transmitting station is thereupon set in motion, and generates the synchronizing pulses 72 which are transmitted to the receiving station, where they set the clock 30 in motion. By this measure, which is generally known in telegraphic technique (teleprinter technique), pulse synchronism of the two clocks 28 and 30 is established. Since the two clocks control, via the magnets 32, 32', the stepping mechanisms of the programme sources, the latter also run synchronously—i.e., at equal step by step rotational velocity. But since synchronizing pulses may be lost (fading) or additional synchronizing pulses be simulated by noise pulses in the wireless channel 20, despite the establishment of pulse synchronism, phase equality of both stepping mechanisms or programme sources has not yet necessarily been established. If the latter is not present, then the two cam plates 40, 40' rotate in different phases, and the change-over of the coding appliances 14 and 16 would not take place as required.

During the cycle of the programme source at the transmitting station, there are further generated the pulse groups 74–80 represented in line 62 which correspond for example to the characters A, B, C and D, which they transmit to the receiver.

The lines 64 and 66 represent the case where, prior to commencement of the synchronizing pulses 72, a noise pulse 82 arrives at the receiver which has already been made ready for operation, where it simulates the arrival of a synchronizing pulse, so that the programme source at the receiving station leads by one step. The lines 68 and 70 illustrate the case where the first synchronizing pulse is missing, and where the stepping mechanism at the receiving station consequently lags by one step. The pulse groups 74, 76, 78 and 80 are therefore generated one step too early or to late respectively by the programme sources at the receiving end. The phase deviation of the stepping mechanisms can be determined in the comparator appliance 56' at the receiving end. On the basis of this determination, the differential 38' at the receiving end is adjusted one step backwards or forwards. This is indicated in the diagrams by the arrows 86 and 88 respectively. This has the result that in the further cycle the characters 78 and 80, or 80, of the programme source at the receiving station coincide chronologically with the corresponding characters of the programme source at the transmitting station. However, this is the criterion for phase equality of the transmitting and receiving programme sources. Both stepping mechanisms now run on without further correction to the limit position, and the actuation of both switching devices 52, 52' represented by the stage 84, takes place simultaneously as required.

Comparison of the character sequences in order to determine phase deviation between transmitter and receiver may be effected by an operator, who in that case also effects the adjustment of the differential manually. However, comparison and adjustment may also be effected automatically. The adjustment may also be effected in a different manner—i.e., without the use of a mechanical differential—for example, in that the advance of the stepping mechanism is interrupted by one step, or in that an additional step is switched in. Use is made of this method more particularly in the case of automatic correction.

Figure 3:
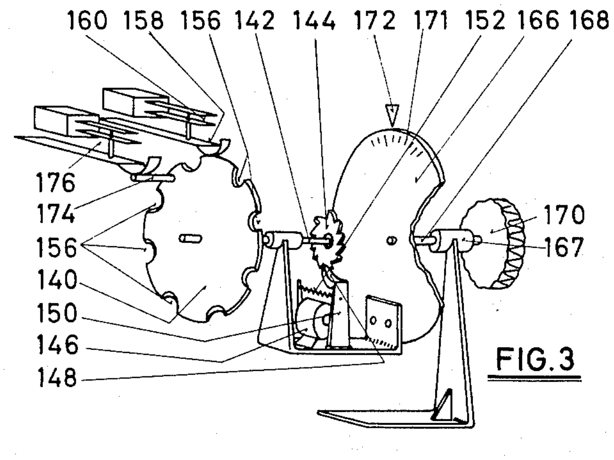
FIGURE 3 is a diagrammatic perspective view of a stepping mechanism usable in the installation shown in FIGURE 1.

FIGURE 3 illustrates in perspective a stepping mechanism, such as used in an arrangement for manual adjustment.

The stepping mechanism possesses, as an essential part, a cam plate 140 which is connected by a shaft 142 to a ratchet wheel 144. Step-by-step advance of the cam plate 140 and the ratchet wheel 144 is effected by a stepping magnet 146, the armature 150 of which is arranged to be attracted towards the magnet and thus to actuate a stepping pawl 148 when current flows. A traction spring 152 serves to move the armature back into the raised position when the current is interrupted. The stepping pawl 148 engages in the ratchet wheel 144 which it advances by one step each time the armature is attracted. The armature is raised by the spring 152, and is then ready for the next step. The cam wheel 140 has at its periphery a number of recesses 156. A spring 158 is so arranged with respect to the periphery of the cam wheel 140 that its end can slide upon the wheel of the plate and can drop into a recess 156 in order to actuate contacts 160. As shown in the drawing, the individual recesses 156 are arranged on the periphery at an interval from one another which corresponds, for example, to five complete steps of advance of the stepping mechanism. If the stepping magnet 146 is fed with pulses of constant chronological interval, then the cam plate 140 is advanced step by step at constant speed, actuates the contacts 160 after every fifth step, and is utilized to generate the character sequence as described hereinafter. The stepping magnet 146 is mounted together with the pawl mechanism on a rotatable disc 166 as base plate, which is rotatably mounted on a shaft 168 supported by means of a bearing 167. The shaft 168 carries at its other end an operating knob 170, whereby the entire stepping mechanism may be rotated about the axis of the shaft 168. In this manner, the entire aarrangement acts as a mechanical differential, since the angle of rotation of the cam plate 140 is equal to the sum of the rotations of the toothed wheel 142 and the hand wheel 170. The disc 166 possesses a graduated scale 171, so that the position of the stepping mechanism can be read off by means of an index 172. Simultaneously, a raster (not shown) is provided for the discs 140 and 166, which exhibits the same peripheral divisions as the toothed wheel 144.

The cam plate 140 further carries a stepping pin 174 which is arranged to actuate a contact 176 once for each complete revolution of the cam plate 140. The required switching process—e.g., the switching on of the coding appliances—is now tripped by the said contact.

Where the stepping mechanism illustrated in FIGURE 3 is used in an arrangement according to FIGURE 1, a clock is further necessary for feeding the stepping magnet 146. Also, the making of the contacts 160 upon the spring 158 dropping into the recesses 156 must be transformed into the character sequence to be transmitted. This augmentation is immediately possible to the expert, for example by making use of the devices and switching means which are in any case present in a teleprinter or in a punched tape reader. The functional coupling is effected in a manner such that, after the transmitter and receiver have been prepared, the clock of the transmitter is set in motion. This sets in motion the stepping mechanism of the transmitting station and, via the clock of the receiving station, the stepping mechanism of the receiving station. Pulse synchronism of the two clocks is established and maintained by the customary means. At each synchronizing pulse, the stepping mechanisms are advanced by one step. So long as the contacts 160 have not been actuated, no characters are generated at the transmitter or at the receiver. On the other hand, by actuation of the contacts 160 when the spring 158 drops into a recess 156, pulse combinations are generated which correspond to a specific letter—e.g., to the letter "V"—of the teleprinter alphabet.

At the receiving station, the incoming character pulses and the character pulses generated by the local appliance are compared in a comparator unit. If the character sequences are running synchronously no printing occurs, i.e., when phase equality exists between the two stepping mechanisms, or in other words when the contacts 160 of the transmitting and of the receiving stepping mechanisms are actuated at the same instance, then the character combinations formed at the transmitting station and at the receiving station cancel one another out in the mixing unit. If on the other hand phase equality is not present, i.e., if the receiving and transmitting stepping mechanisms are not running in equal phase, then the transmitting character arrives late or early with respect to the local character. The receiver prints, in succession, the character transmitted by the transmitting station and the character generated in the receiving station. The watching operator at the receiving station is able to decide from the printing of the characters that phase equality is not present between transmitter and receiver. In order to carry out the corrections it is necessary for him to be able to detect whether the receiver is leading or lagging—i.e., whether the stepping mechanism of the receiver must be accelerated or decelerated in order to establish phase equality. For this purpose, an apparatus is present, upon actuation of which a deviating local character, e.g., the character "M," is generated at the receiving station. The character generated by the receiving station is therefore printed as "M," but the character originating from the transmitting station continues to be printed as "V." The operator can determine from the sequence of the letters V and M whether the stepping mechanism at the receiving station is leading or lagging. By rotating the hand knob 170, the stepping mechanism together with the cam plate 140 can now be adjusted backwards or forwards by the corresponding number of steps, until phase equality of receiver and transmitter is established. The stepping mechanism at the transmitting station and at the receiving station now run in equal phase, namely until the switch levers 174 actuate the contacts 176.

Phase equality of the stepping mechanisms of the transmitting station and of the receiving station is achieved by manual regulation of the stepping mechanism at the receiving station to the character sequence sent out by the stepping mechanism of the transmitting station. The change-over takes place automatically at the same instant of time by the stepping mechanisms which are now both running in equal phase.

Figure 4:
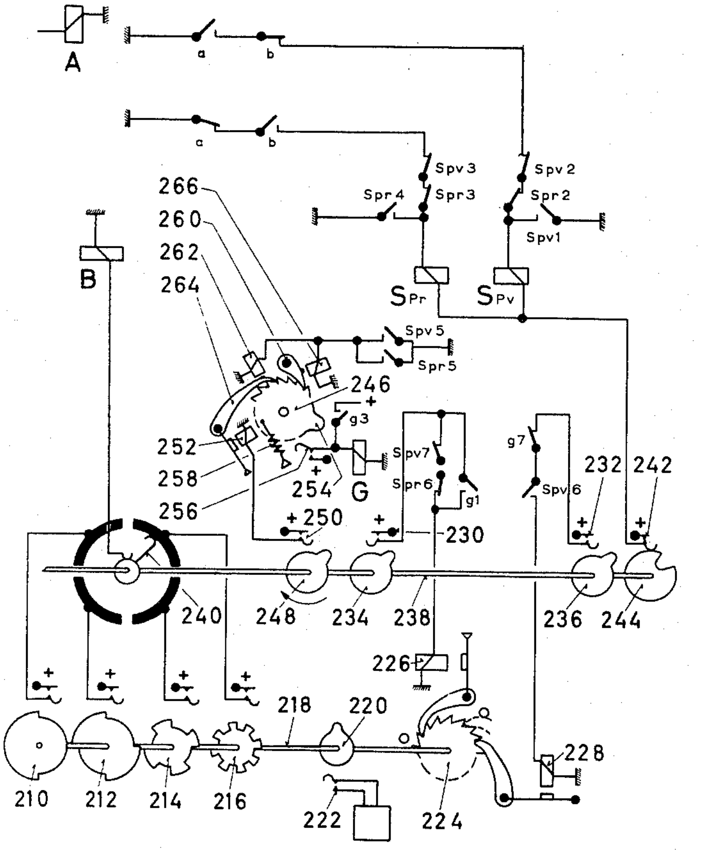
FIGURE 4 shows partially diagrammatically the circuit lay-out of the receive unit of an automatic installation.

FIGURE 4 shows a further embodiment, wherein the synchronism check and adjustment of the receiving station is effected automatically. To this end, there are formed at the transmitting station and at the receiving station character sequencies which correspond to a progressive sequence of binary numbers.

| Number serial | Transmitter | Receiver lagging | Receiver leading |
|---|---|---|---|
| | | | 0 0 0 0 |
| 1 | 0 0 0 0 | | 0 0 0 1 |
| 2 | 0 0 0 1 | 0 0 0 0 | 0 0 1 0 |
| 3 | 0 0 1 0 | 0 0 0 1 | 0 0 1 1 |
| 4 | 0 0 1 1 | 0 0 1 0 | 0 1 0 0 |
| 5 | 0 1 0 0 | 0 0 1 1 | 0 1 0 1 |
| 6 | 0 1 0 1 | 0 1 0 0 | 0 1 1 0 |
| 7 | 0 1 1 0 | 0 1 0 1 | 0 1 1 1 |
| (and so on). | | | |
| 15 | 1 1 1 0 | | |
| 16 | 1 1 1 1 | | |

In order to check synchronism, the pulse combinations corresponding to the individual binary numbers are compared position by position, namely commencing at the highest positional value. If the comparison of the highest position reveals equality, then comparison of the next position follows. When the comparison reveals a deviation for the first time, then leading or lagging on the part of the receiver can be deduced from the direction of the deviation, a higher digital value indicating leading in each case.

As an example, let us consider, for example, the case of number serial 5, in the first place in the case of a lagging receiver. The highest (first) position of both numbers is "0" the comparison reveals no deviation. Comparison of the second position reveals "1" at the transmitter, "0" at the receiver, which indicates that the receiver is lagging. In the case where the receiver is leading, the comparison of the first position reveals "0" for both numbers, the comparison of the second position "1" for both numbers, and a comparison of the third position "0" for both numbers. Only the comparison of the fourth and final position reveals "0" for the transmitter and "1" for the receiver, indicating that the receiver is leading.

When leading or lagging has been determined at any position of the numbers compared, testing must not be continued, since comparison of the following positions is irrelevant and may even lead to a false result. For example, if testing were continued in the above example in the case where the receiver is lagging, then comparison of the third position would reveal "0" at the transmitter and "1" at the receiver. This however by no means signifies that the receiver is leading, since solely the comparison of the highest deviating position of the number is decisive of this point. This is readily comprehensible if we consider the circumstances, for example when comparing the decimal numbers "1611" and "1599." Comparison of the first position reveals numerical equality. Comparison of the second position reveals the correct result—"6 greater than 5." On the other hand, further testing of the third and fourth positions would reveal a false result in each case—"9 greater than 1."

FIGURE 4 shows diagrammatically the structure and circuit of the receiver. Four contact discs 210, 212, 214 and 216, which revolve with the programme source shaft 218, serve to generate the binary number pulses. The four contact discs correspond to the four positions of the binary number and exhibit a corresponding division of the periphery into the peripheral portions which do, and which do not, actuate the associated contact, while sixteen states are provided. Also located on the programme source shaft is a switching disc 220 which actuates a contact 222 serving to perform the desired switching process. The drive of the programme source shaft is effected via a ratchet wheel 224 by means of stepping magnets 226 and 228 provided with stepping pawls. The shaft 218 is advanced by one step each time by the magnet 226, and by two steps each time by the magnet 228. The magnet 226 serves for normal step-by-step driving, and the magnet 228 for step correction as hereinafter described. The control of the magnets 226 and 228 is effected through contacts 230 and 232 respectively by means of cam plates 234 and 236 which are mounted on a control shaft 238. Also mounted on the control shaft 238 is a rotating distributor 240, segments of which are connected to the four contacts of the contact discs 210–216. Upon rotation of the distributor 240, the pulse sequence corresponding to the particular state of the contact discs is obtained. The programme source shaft therefore executes exactly one complete revolution for sixteen revolutions of the control shaft, corresponding to the sixteen states of the contact discs 210–216 (unless the step correction described hereinafter is effected).

A sliding contact 242 feeds a relay B. The pulses generated by an identical arrangement at the transmitting station feed a relay A. Pulse synchronism of the transmitting station and the receiving station is established by making use of means known from teleprinter technique, so that the control shaft 238 and distributor 240 run synchronously. The relays A and B are generally rapid-acting telegraph relays, and each possess one make contact *a* or *b* and one normal contact *b* or *a*. The latter are located in the feed conductor of the relays $S_{Pr}$ and $S_{Pv}$, and are connected in pairs in opposite series, so that when the relays A and B are fed with similar pulses—both pulses "0" or "1"—the relays $S_{Pr}$ and $S_{Pv}$ cannot pick up. The series-connected normal contacts $S_{Pv7}$ and $S_{Pr6}$ are accordingly closed. The stepping magnet 226 is actuated once via the contact disc 234 and contact 230 as the control shaft 238 revolves, and the programme source shaft is advanced by one step.

However, if dissimilar pulses occur, one of the two relays $S_{Pv}$ or $S_{Pr}$ picks up. For example, if A is energized, ("1") and B is not energized ("0"), which indicates that the receiver is lagging, then the relay $S_{Pv}$ picks up. On the other hand, if B is energized ("1") and A not ("0"), indicating that the receiver is leading, then the relay $S_{Pr}$ picks up. When one of these two relays has picked up, then one of the two normal contacts $S_{Pv7}$ or $S_{Pr6}$ has been opened; it is impossible for the stepping magnet 226 to be energized. If the relay $S_{Pr}$ was energized, then accordingly no advancing of the programme source shaft takes place. The receiver is stopped for one step, and the lead on the part of the receiver—determined from the deviation of the pulses—is decreased by one step. If the relay $S_{Pv}$ was energized, then the contact $S_{Pv6}$ is closed, the programme source shaft 218 is advanced by two steps via the stepping magnet 228, and the lag of the receiver—determined from the deviation of the pulses—is corrected by one step.

It remains to be pointed out that the actuation of the stepping magnets 226 and 228 via the contact discs 234 and 236 occurs in every case shortly before the termination of a complete revolution of the control shaft 238. Likewise, the feed of the relays $S_{Pv}$ and $S_{Pr}$ via the contact 242 and the associated contact disc 244 is interrupted in every case shortly before completion of a full revolution of the control shaft, and the two relays are made ready for testing the following binary number. As the test apparatus is intended to respond only at the highest positional values of the binary number which show a deviation, and to be insensitive to deviations in the subsequent lower positional values, the normal contacts $S_{Pv3}$, $S_{Pv2}$, $S_{Pr3}$ and the make contacts $S_{Pv1}$, $S_{Pr4}$ are provided, which switch off the feed to the relays $S_{Pv}$ and $S_{Pr}$ via the contacts *a, b,* $\overline{a}$, $\overline{b}$, and connect the relays direct to earth after the relays A and B have picked up for the first time. Since this switching off is effected upon the first determination of a position deviation, the further operation of the relays A and B is eliminated in the case of a difference being determined in the subsequent positions of the same binary number. The relays A and B therefore respond—independently of the position—to every deviation of the pulses, but the relays $S_{Pv}$ and $S_{Pr}$ on the other hand respond only to the first deviation determined in the particular binary number. They are then self-holding and control the correction of the programmed source shaft at the end of the revolution.

The arrangement according to FIGURE 4 further contains a device whereby the entire readjustment of the phase is set out of action as soon as the comparison of the pulse sequences has revealed phase equality several times consecutively. This purpose is served by a further stepping mechanism, a toothed wheel 246 of which is advanced by one step by a contact disc 248 through a contact 250 and a stepping magnet 252 for each revolution of the control shaft 238. The toothed wheel 246 possesses a switch cam 254 which after a specific number of steps—e.g., after three steps—actuates a contact 256 which causes a relay G to pick up. When the relay G has responded, it is self-holding via a contact *g*3. The stepping magnet 228 is simultaneously set out of action via a normal contact *g*2, and the feed of the stepping magnet 226 is taken over by a make contact *g*1 by short-circuiting of the contacts $S_{Pv7}$ and $S_{Pr6}$. Therefore, when the switching cam 254 has closed the contact 256 the programme source shaft 218 continues to be advanced step by step in uniform rhythm.

The toothed wheel 246 is further subject to the action of a restoring spring 258 and a retaining pawl 260, whereas a magnet 262 when energized holds the pawl 264 of the stepping magnet 258 out of engagement. The retaining pawl is brought out of engagement when a magnet 266 is energized. The magnets 262 and 266 are energized upon closure of the make contacts $S_{Pv5}$ and $S_{Pr5}$. These contacts are closed as soon as the comparison of pulses indicates that the receiver is leading or lagging. The pawls 264 and 260 are attracted by the magnets 262 and 266 respectively and brought out of engagement, so that the ratchet wheel 246 jumps back into the initial position by the action of the restoring spring 258. However, if the toothed wheel has executed three steps consecutively—i.e., if phase equality of transmitter and receiver has been determined consecutively in the case of three complete numbers, then the contact 256 is closed by the cam 254, the relay G picks up and locks the advance of the programme source shaft against further corrective interventions.

The arrangement illustrated in FIGURE 4 operates with relays. The invention is of course not restricted to the use of relays, but on the contrary valves, transistors or other appropriate logistical elements may also be used.

Figure 5:
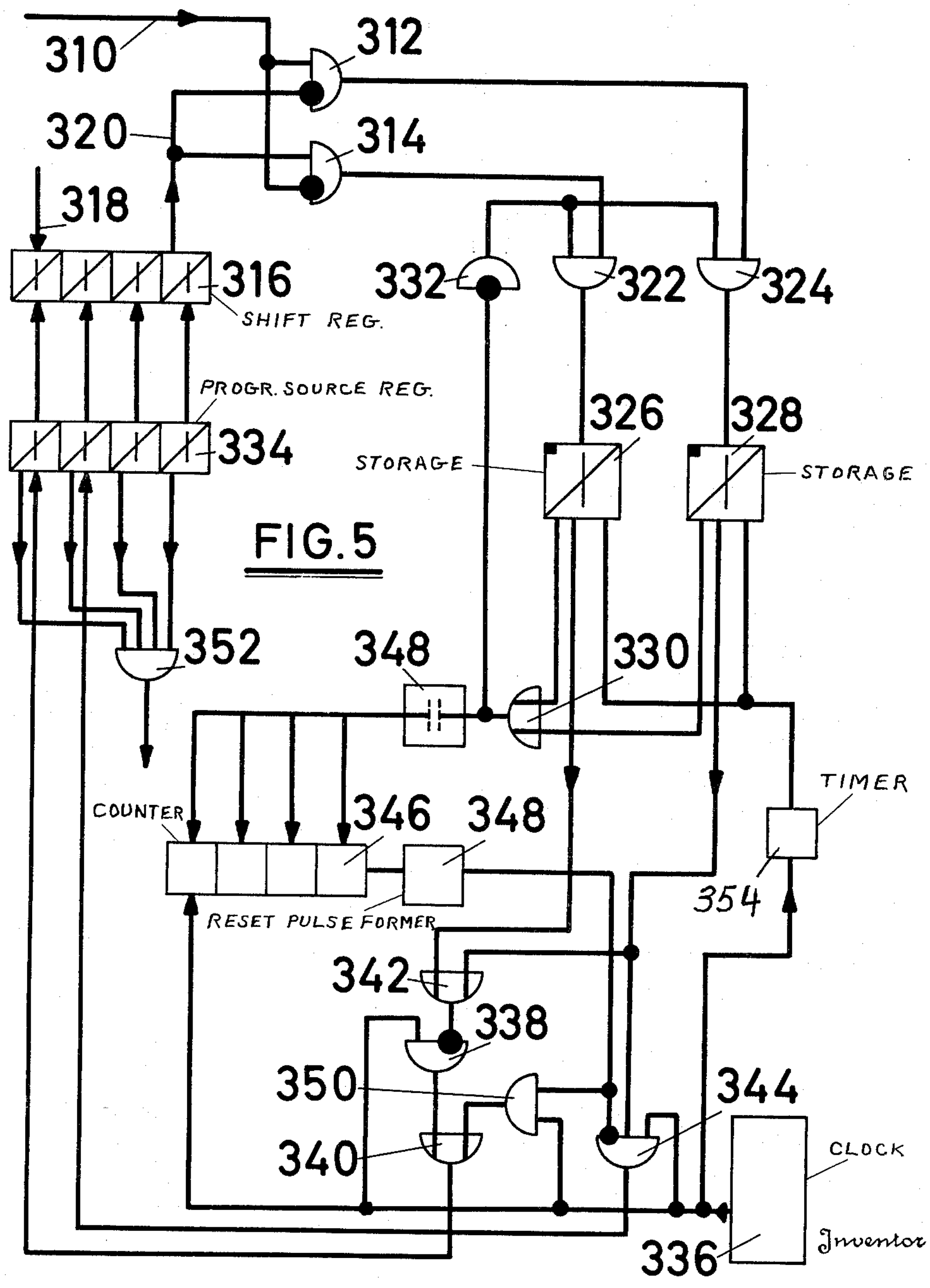
FIGURE 5 shows a receiver circuit, which is similar to FIG. 4 but which utilizes logistical elements exclusively.

FIGURE 5 shows an arrangement which corresponds in its function to the arrangement according to FIGURE 4, but wherein elements of logistical electronics are used exclusively. The arrangement again operates with a progressive sequence of binary numbers, namely once again of four-position binary numbers.

The pulses arriving from the transmitting station via a conductor 310 pass to the inputs of two AND-gates 312 and 314. Located at the receiving station is a four-position shift register 316 which contains the series of binary numbers in stored form and which is shifted by one number at a time by a shift pulse 318 in chronological coincidence with the incoming pulse programme, so that the receiving-end programme of binary number pulses appears at an output 320. Two of the four inputs to the AND-gates 312 and 314 are of reverse construction. This has the result that an output pulse occurs at one of the gates only in the case of dissimilarity of the incoming and receiving-end pulses. Taking as a basis the pulse programme referred to hereinabove, which corresponds to a binary number ascending from 0 0 0 0 to 1 1 1 1, a pulse occurs at the AND-gate 312 in the case where the receiver is lagging, and at the AND-gate 314 in the case where the receiver is leading. These pulses pass via AND-gates 322 and 324 to two storage stages 326 and 328, and access of further pulses to the two storage stages is blocked by the output of the particular storage stage via an OR-gate 330 and an inverter 332. Therefore, as already explained in the case of the arrangement according to FIGURE 4, in every case only the inequality of the highest position is evaluated, whereas inequality in the following positions is inoperative.

The local programme is generated by a programme source register 334, which is controlled by a self-clock 336. The storage stages of the shift register 316 and of the programme source 334 are connected individually in parallel. The advance of the programme source register 334, is effected in rhythm, in the case of synchronism, via an AND-gate 338 and an OR-gate 340, since, having regard to the reversal of the corresponding input of the AND-gate 338, an output pulse occurs at the latter in the absence of any output pulse of the storage stages 326 and 328 via the OR-gate 342, which would indicate unbalanced running. In the event that the receiver leads, a pulse occurs at the output of the storage stage 326. The advance of the programme source is switched off for one step via the AND-gate 338 and the OR-gate 342, and the lead is reduced by one step. In the event that the receiver lags, a pulse occurs at the output of the storage stage 328 which via the OR-gate 342 inhibits the normal advance of the programme source 334, and passes via an AND-gate 344 to the second position of the programme source 334 and advances the latter by two positions. The lag on the part of the receiver is thereby reduced by one position. Furthermore, a four-position counter unit 346 is provided which is advanced by the self-clock 336, but which is continually reset to zero by means of a resetting pulse former 348 as soon as a pulse occurs at the output of the OR-gate 330—i.e., immediately leading or lagging is present. If the counter reaches "4," a store 348 is switched in which ensures—via the AND-gate 350 and the OR-gate 340—that the programme source 334 executes one and only one step upon each clock pulse, namely irrespective of whether a synchronism error is subsequently simulated, for example by noise pulses. An AND-gate 352 is connected in parallel with the four storage stages of the programme source 334, and upon changing-over of the programme source from "16," to "0," responds and effects the desired triggering of the switching process. A timer 354 ensures that the conditions of coincidence necessary for functioning are reliably present for the duration of the clock pulse—e.g., at the AND-gate 344.

The invention is moreover not restricted to the case discussed in the examples, of simultaneous switching on of coding appliances in the case of a message connection, but may be applied wherever the simultaneous performance of a switching process is required to be ensured in such connections where disturbance of the synchronism by noise pulses is possible.

What is claimed is:

1. Apparatus for simultaneously performing a switching operation in at least one transmitter unit and receiver unit located spatially apart from one another, said apparatus comprising for each unit an impulse sender, a program sender and means for synchronizing said impulse senders, said program senders being driven by said impulse senders with synchronized impulses, each of said program senders producing an identical sequence of program signals being limited in time and consisting of impulse combinations, each of said impulse combinations being different from all the other impulse combinations of its sequence and having a predetermined position within its sequence, means for transmitting said signal sequence produced by the program sender from the transmitter unit to the receiver unit, means provided in said receiver unit for comparing said signal sequences impulse combination by impulse combination and for producing a control signal which indicates the direction of any deviation in time of the signal sequence produced by the program sender of the receiver unit with respect to the signal sequence produced by the program sender of the transmitter unit, means in said receiver unit for varying the speed of its own program sender in the opposite direction to that indicated by said control signal and means by which each program sender releases a switching operation by its own unit after a predetermined number of program steps whose number is identical in said program senders.

2. Apparatus for simultaneously performing a switching operation in at least one transmitter unit and receiver unit located spatially apart from one another, said apparatus comprising for each unit an impulse sender, a program sender and means for synchronizing said impulse senders, said program senders being driven by said impulse senders with synchronized impulses, each of said program senders producing an identical sequence of program signals being limited in time and consisting of impulse combinations, each of said impulse combinations being different from all the other impulse combinations of its sequence and having a predetermined position within its sequence and in which sequence each of said impulse combinations represents a printer code for a sign, means for transmitting said signal sequence produced by the program sender from the transmitter unit to the receiver unit, said receiver unit including a recording device such as a printer for recording together said sequences of program signals in the form of sign sequences, said recording device being used as a means for visibly indicating any deviation in time of the signal sequence produced by the program sender of the receiver unit with respect to the signal sequence produced by the program sender of the transmitter unit, means in said receiver unit for varying the speed of its own program sender in either direction for determining the direction of said deviation in time and for correcting this deviation and means by which each program sender releases a switching operation by its own unit after a predetermined number of program steps whose number is identical in said program senders.

3. Apparatus for simultaneously performing a switching operation in at least one transmitter unit and receiver unit located spatially apart from one another, said apparatus comprising for each unit an impulse sender, a program sender and means for synchronizing said impulse senders, said program senders being driven by said impulse senders with synchronized impulses, each of said program senders producing an identical sequence of program signals being limited in time and consisting of impulse combinations, each of said impulse combinations being different from all the other impulse combinations of its sequence and having a predetermined position within its sequence and in which sequence each of said impulse combinations represents a printer code for a sign, means for transmitting said signal sequence produced by the program sender from the transmitter unit to the receiver unit, means provided in said receiver unit for varying one of said signal sequences and sign sequences respectively before recording so that signals associated with said receiver and transmitter program senders respectively can be distinguished, said receiver unit including a recording device such as a printer for recording together said sequences of program signals in the form of sign sequences, said recording device being used as a means for visibly indicating any deviation in time and its direction of the signal sequence produced by the program sender of the receiver unit with respect to the signal sequence produced by the program sender of the transmitter unit, means in said receiver unit for varying the speed of its own program sender in the opposite direction to that indicated by said recording device and means by which each program sender releases a switching operation by its own unit after a predetermined number of program steps whose number is identical in said program senders..

4. Apparatus for simultaneously performing a switching operation in at least one transmitter unit and receiver unit located spatially apart from one another, said apparatus comprising for each unit an impulse sender, a program sender and means for synchronizing said impulse senders, said program senders being driven by said impulse senders with synchronized impulses, each of said program senders producing an identical sequence of program signals corresponding to a rising series in the binary system, means for transmitting said signal sequence produced by the program sender from the transmitter unit to the receiver unit, means provided in said receiver unit for comparing said signal sequences binary number by binary number and place by place starting with the highest place and for producing a control signal if said comparison reveals a deviation which control signal indicates the direction of said deviation and therefore the direction of the deviation in time of the signal sequence produced by the program sender of the receiver unit with respect to the signal sequence produced by the program sender of the transmitter unit, means in the receiver unit for delay or step-up additionally its own program sender by at least one step in the opposite direction to that indicated by said control signal, means in the receiver unit which stop the comparison of the succeeding lower places of the respective binary number and means by which each program sender releases a switching operation by its own unit after a predetermined number of program steps whose number is identical in said program senders.

5. Apparatus according to claim 4 which further includes means which interrupt further comparison between binary numbers of said signal sequences and readjustment of said receiver program sender as soon as the comparison of the impulse sequences yields several times in succession a state of synchronous agreement.

References Cited by the Examiner

UNITED STATES PATENTS

| | | | |
|---|---|---|---|
| 2,506,766 | 5/50 | Bartelink | 340—147 |
| 2,527,650 | 10/50 | Peterson | 179—15 |
| 2,669,706 | 2/54 | Gray. | |
| 2,679,034 | 5/54 | Albrighton | 340—163 |
| 2,816,163 | 12/57 | Robin | 178—69.5 |
| 2,929,974 | 3/60 | Wells | 178—69.5 |
| 2,934,604 | 4/60 | Bizet | 178—69.5 |
| 2,981,795 | 4/61 | Cupella | 178—69.5 |
| 3,009,018 | 11/61 | Strickholm et al. | 178—69.5 |
| 3,067,285 | 12/62 | Turner | 178—69.5 |

NEIL C. READ, *Primary Examiner.*